United States Patent
Kim et al.

(10) Patent No.: US 9,203,475 B2
(45) Date of Patent: Dec. 1, 2015

(54) WIRELESS POWER TRANSMISSION SYSTEM, WIRELESS POWER RECEIVING APPARATUS, AND WIRELESS POWER RECEIVING METHOD

(71) Applicant: LS Cable & System Ltd., Anyang-si, Gyeonggi-do (KR)

(72) Inventors: Young Sun Kim, Gunpo-si (KR); Un Kyu Park, Hwaseong-si (KR); Sung Han You, Seoul (KR); Min Seok Han, Suwon-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 376 days.

(21) Appl. No.: 13/723,821

(22) Filed: Dec. 21, 2012

(65) Prior Publication Data
US 2014/0152114 A1    Jun. 5, 2014

(30) Foreign Application Priority Data
Dec. 3, 2012  (KR) .......................... 10-2012-0138698

(51) Int. Cl.
| | |
|---|---|
| *H02H 7/00* | (2006.01) |
| *H04B 5/00* | (2006.01) |
| *H02J 7/02* | (2006.01) |
| *H02J 7/04* | (2006.01) |
| *H02J 17/00* | (2006.01) |
| *B60L 11/18* | (2006.01) |
| *H02J 5/00* | (2006.01) |

(52) U.S. Cl.
CPC .............. *H04B 5/0037* (2013.01); *H02J 7/025* (2013.01); *H02J 7/045* (2013.01); *H02J 17/00* (2013.01); *H04B 5/0093* (2013.01); *B60L 11/182* (2013.01); *H02J 5/005* (2013.01)

(58) Field of Classification Search
USPC ...................................... 307/104; 361/18, 91.1
See application file for complete search history.

(56) References Cited

U.S. PATENT DOCUMENTS

2010/0001663 A1*  1/2010  Wu et al. ........................ 315/308
2012/0293009 A1*  11/2012  Kim et al. ..................... 307/104

FOREIGN PATENT DOCUMENTS

KR    10-2011-0131954    12/2011

* cited by examiner

*Primary Examiner* — Danny Nguyen
(74) *Attorney, Agent, or Firm* — Paratus Law Group, PLLC

(57) ABSTRACT

Disclosed are a wireless power receiving apparatus, a wireless power transmission system, and a wireless power receiving method. The wireless power receiving apparatus includes a power receiving coil for receiving a power signal wirelessly transmitted, a rectifier circuit for rectifying the power signal into direct current (DC) output power, a switching unit for controlling input of the power signal to the rectifier circuit at an rear end of the power receiving coil, and a control unit for measuring a voltage of the DC output voltage, comparing the voltage with a predetermined allowable voltage, and controlling an operation of the switching unit.

12 Claims, 5 Drawing Sheets

WIRELESS POWER TRANSMISSION SYSTEM, WIRELESS POWER RECEIVING APPARATUS, AND WIRELESS POWER RECEIVING METHOD

CROSS REFERENCE TO PRIOR APPLICATION

The present application claims priority under 35 U.S.C. §119 to Korean Patent Application No. 10-2012-0138698 (filed on Dec. 3, 2012), which is hereby incorporated by reference in its entirety.

BACKGROUND OF THE INVENTION

1. Field of the Invention

The present invention relates to a wireless power transmission system, a wireless power receiving apparatus, and a wireless power receiving method using the wireless power receiving apparatus.

2. Description of the Related Art

Wireless power transmission refers to a technology for wirelessly supplying power to home appliances or electronic vehicles without a conventional wired power line. Via such a wireless power transmission technology, a device requiring power can be wirelessly charged without being connected to a power outlet. Accordingly, relevant research on the wireless power transmission technology is being actively conducted.

The wireless power transmission technology is broadly classified into a magnetic induction method, a magnetic resonance method, and a microwave method. The magnetic induction method is a technology using magnetic inductive coupling between adjacent coils. In this case, a distance between two power transmitting and receiving coils is less than several cm and transmission efficiency is largely changed according to arrangement conditions of the two coils. The magnetic resonance method is a technology for transmitting non-radial magnetic field energy between two resonators spaced apart from each other via resonant coupling. In this regard, it is advantageous that power can be wirelessly transmitted when a distance between transmitting and receiving coils is from 1 m to 2 m, that it is easy to arrange the two coils compared with the magnetic induction method, and that a wireless rechargeable range can be extended using a repeat method. The microwave method is a technology for transmitting power by radiating an electromagnetic wave with an ultra high frequency, such as a microwave, through an antenna. In this case, long-distance wireless power transmission is possible. However, safety issues associated with electromagnetic waves need to be considered.

A wireless power transmission system includes a wireless power transmitting apparatus for wirelessly transmitting power and a wireless power receiving apparatus for wirelessly receiving the power. In this regard, when a plurality of wireless power receiving apparatuses are charged by a single wireless power transmitting apparatus, power received by each wireless power receiving apparatus may vary according to a battery charge state thereof and a relative position or distance from the wireless power transmitting apparatus. Thus, an overvoltage exceeding an allowable voltage of an internal circuit can be applied to the wireless power transmission system, and thus, the internal circuit can break down.

Accordingly, there is a need to control an input state of such overpower in a wireless power receiver.

CITED REFERENCE

Patent Document

Korean Patent Publication No. 2011-0131954, "Wireless Power Transmission System and Wireless Power Transmission Method"

SUMMARY OF THE INVENTION

Therefore, the present invention has been made in view of the above problems, and it is an object of the present invention to provide a wireless power receiving apparatus, a wireless power transmission system, and a wireless power receiving method, which may monitor an amplitude of a received voltage and may prevent introduction of overpower whereby an internal circuit may break down.

It is another object of the present invention to provide a wireless power receiving apparatus, a wireless power transmission system, and a wireless power receiving method, which may control a voltage induced in the internal circuit within an appropriate operating voltage range.

Objects of the present invention are not limited to the above-described objects and will be obvious from the description, or may be learned by practice of the invention.

In accordance with the present invention, the above and other objects can be accomplished by the provision of a wireless power receiving apparatus comprising a power receiving coil for receiving a power signal wirelessly transmitted, a rectifier circuit for rectifying the power signal into direct current (DC) output power, a switching unit for controlling input of the power signal to the rectifier circuit at an rear end of the power receiving coil, and a control unit for measuring a voltage of the DC output power, comparing the voltage with a predetermined allowable voltage, and controlling an operation of the switching unit.

The control unit may adjust received power by feedback controlling a voltage of the power signal with a duty ratio about periods of time that the switching unit is turned on and off when the measured voltage exceeds the allowable voltage.

The switching unit may be disposed between both ends of the power receiving coil or a matching circuit or is disposed on a path between the power receiving coil and the rectifier circuit.

The control unit may select a duty ratio set for each respective voltage level in a circuit operating voltage table, based on the measured voltage, and controls the switching unit with the duty ratio.

The switching unit may control supply of the DC output power to a battery between the rectifier circuit and the battery.

The power receiving coil and a power transmitting coil of a wireless power transmitting apparatus may be magnetically coupled to each other to transmit the power signal using a magnetic induction method or a magnetic resonance method.

The wireless power receiving apparatus may further comprising a matching circuit disposed between the power receiving coil and the rectifier circuit and comprising at least one of a serial resonance circuit and a parallel resonance circuit.

And In accordance with an aspect of the present invention, the above and other objects can be accomplished by the provision of a wireless power transmission system comprising a wireless power transmitting apparatus for transmitting a power signal to a power transmitting coil to generate a magnetic field around the power transmitting coil, and one or more wireless power receiving apparatuses coupled to the magnetic field, for wirelessly receiving the power signal, wherein the wireless power receiving apparatuses measure a change in a voltage of the power signal and control received power, based on the measurement result.

Each of the wireless power receiving apparatuses may comprise a power receiving coil magnetically coupled to the power transmitting coil, for receiving the power signal, a rectifier circuit for rectifying the power signal into direct current (DC) output power, a switching unit for controlling input of the power signal to the rectifier circuit at a rear end of the power receiving coil or on a path between the power receiving coil and the rectifier circuit, and a control unit for measuring a voltage of the DC output power, comparing the voltage with a predetermined allowable voltage, and controlling an operation of the switching unit.

The control unit may adjust received power by feedback controlling the voltage of the power signal with a duty ratio about periods of time that the switching unit is turned on and off when the measured voltage exceeds the allowable voltage.

The control unit may select a duty ratio set for each respective voltage level in a circuit operating voltage table, based on the measured voltage, and controls the switching unit with the duty ratio.

The power receiving coil and the power transmitting coil may be magnetically coupled to each other to transmit the power signal using a magnetic induction method or a magnetic resonance method.

The each of the wireless power receiving apparatuses may further comprises a matching circuit disposed between the power receiving coil and the rectifier circuit and comprising at least one of a serial resonance circuit and a parallel resonance circuit.

And In accordance with an aspect of the present invention, the above and other objects can be accomplished by the provision of a wireless power receiving method of a wireless power receiving apparatus, the method comprising receiving a power signal wirelessly via magnetic resonance coupling at a power receiving circuit, connecting the power receiving coil and an internal circuit to each other through a switching unit, measuring a voltage induced in the internal circuit by the power signal, and controlling the switching unit so as to maintain the measured voltage within an operating voltage range of the internal circuit.

The wireless power receiving method may further comprising predetermining at least one of the operating voltage range of the internal circuit and a maximum allowable voltage, prior to the receiving the power signal.

The controlling the switching unit may comprise controlling the operation of the switching unit with a predetermined duty ratio to reduce the voltage induced in the internal circuit when the measured voltage is equal to or greater than the maximum allowable voltage.

The controlling the switching unit may comprise selecting a duty ratio set for each respective level in a circuit operating voltage table, based on the measured voltage and controlling the operation of the switching unit with the duty ratio.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
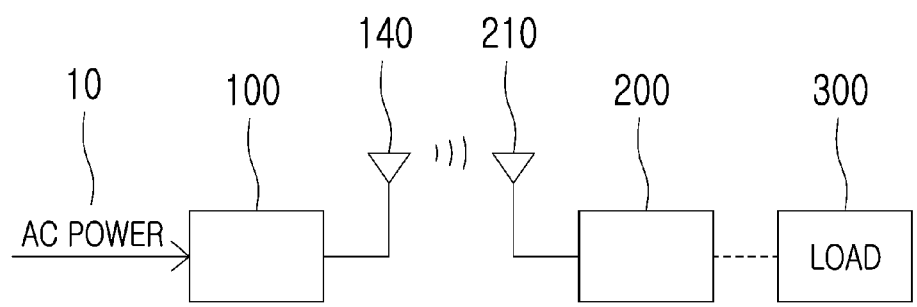
FIG. 1 is a schematic diagram of a wireless power transmission system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In the description of the present invention, certain detailed explanations of related art are omitted when it is deemed that they may unnecessarily obscure the essence of the invention. Terms such as "first" and "second" are used herein merely to describe a variety of constituent elements.

It will be understood that when an element, such as a layer, a region, or a substrate, is referred to as being "on", "connected to" or "coupled to" another element, it may be directly on, connected or coupled to the other element or intervening elements may be present unless clearly specified otherwise.

Throughout this specification, a wireless power receiving apparatus may be a charging apparatus having a rechargeable battery installed therein and may be a mobile terminal such as a cellular phone, a smart phone, a laptop computer, a digital broadcasting terminal, a personal digital assistant (PDA), a portable multimedia player (PMP), or a navigation device or an electronic device such as a wall-mounted television (TV), a lamp, a digital photo frame, or a vacuum cleaner.

Hereinafter, the present invention will be described in detail by explaining exemplary embodiments of the invention with reference to the attached drawings.

FIG. 1 is a schematic diagram of a wireless power transmission system according to an embodiment of the present invention.

Referring to FIG. 1, the wireless power transmission system according to the present embodiment wirelessly transmits power between a wireless power transmitting apparatus 100 and one or more wireless power receiving apparatuses, that is, a wireless power receiving apparatus 200. In this case, a magnetic induction method or a magnetic resonance method may be used to transmit power between the wireless power transmitting apparatus 100 and the wireless power receiving apparatus 200.

The wireless power transmitting apparatus 100 generates a magnetic field in order to transmit power. The wireless power receiving apparatus 200 is coupled to the magnetic field to generate output power that is stored or consumed in the wireless power receiving apparatus 200.

The wireless power transmitting apparatus 100 and the wireless power receiving apparatus 200 may resonate with each other at a predetermined frequency. When a resonant frequency of the wireless power transmitting apparatus 100 is the same as or similar to a resonant frequency of the wireless power receiving apparatus 200, transmission efficiency therebetween may be maximized.

The wireless power transmitting apparatus 100 includes a power transmitting coil 140 as a power transmitter. The wireless power transmitting apparatus 100 converts alternating current (AC) power 10 supplied from an external power source into a radio frequency (RF) power signal of a desired frequency and then applies the RF power signal to the power transmitting coil 140 to generate the magnetic field around the power transmitting coil 140.

The wireless power receiving apparatus 200 includes a power receiving coil 210 as a power receiver. When the power receiving coil 210 is positioned in the magnetic field generated by the power transmitting coil 140, the power receiving coil 210 and the power transmitting coil 140 are coupled to each other in a resonant state at a predetermined frequency, and the power receiving coil 210 receives the RF power signal.

The wireless power receiving apparatus 200 generates a direct current (DC) power output in order to charge a battery or to supply power to a load device 300 outside the wireless power receiving apparatus 200 in response to the received RF power signal.

As described above, for efficient power transmission, it is necessary to couple the wireless power transmitting apparatus 100 and the wireless power receiving apparatus 200 to each other in a resonant state. However, even if the wireless power transmitting apparatus 100 and the wireless power receiving apparatus 200 are not coupled to each other in a resonant state, it is possible to transmit power with low transmission efficiency.

Figure 2:
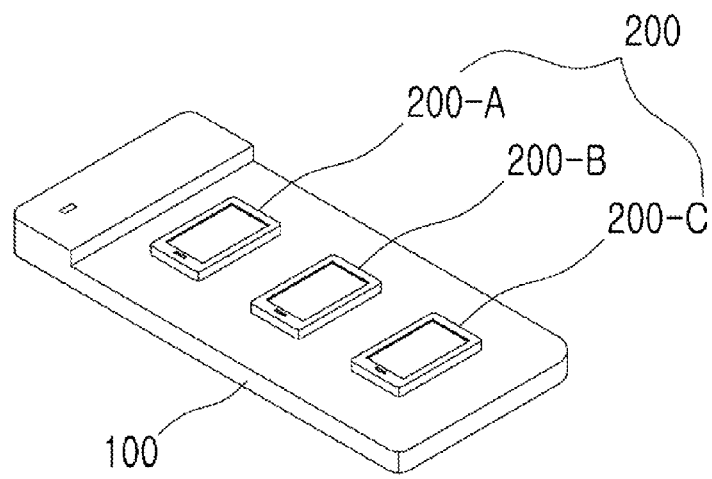
FIG. 2 is a perspective view a wireless power transmission system according to an embodiment of the present invention.

FIG. 2 is a perspective view of a case in which a plurality of wireless power receiving apparatuses 200-A to 200-C of the wireless power receiving apparatus 200 is charged by the wireless power transmitting apparatus 100, according to an embodiment of the present invention.

As shown in FIG. 2, when a plurality of wireless power receiving apparatuses 200-A to 200-C is charged by a single wireless power transmitting apparatus 100, the wireless power receiving apparatuses 200-A to 200-C have different discharging states, and thus, electric energies of transmitted powers required to charge the wireless power receiving apparatuses 200-A to 200-C may be different from each other.

Received electric energies of the wireless power receiving apparatuses 200-A to 200-C may be different from each other according to a relative position and distance from the power transmitting coil 140 of the wireless power transmitting apparatus 100. In particular, when an overvoltage exceeding an allowable voltage is applied to devices included in an internal circuit of the wireless power receiving apparatus 200, the devices may break down.

Figure 3:
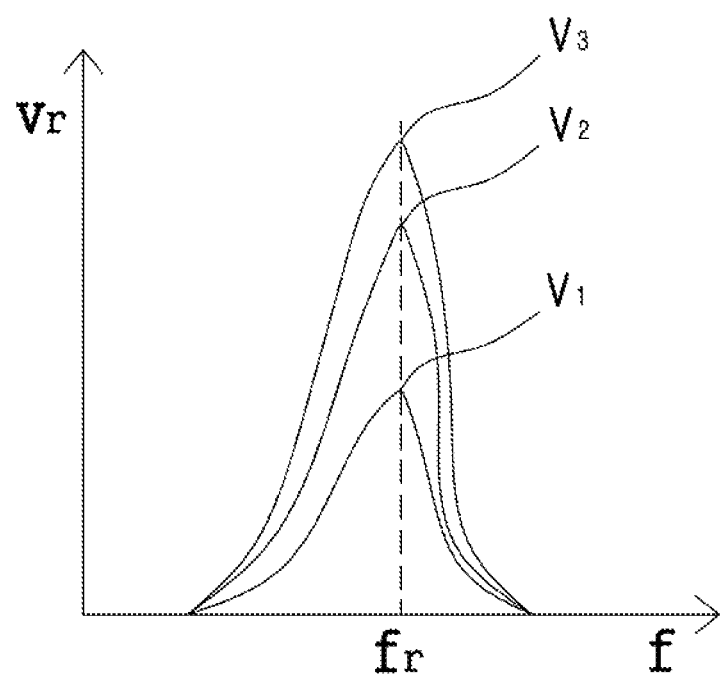
FIG. 3 is a graph showing a voltage change according to load of a wireless power receiving apparatus according to an embodiment of the present invention.

Referring to FIG. 3, for example, when an internal battery of the wireless power receiving apparatus 200-A is completely discharged and an internal battery of the wireless power receiving apparatus 200-C is almost completely charged, charging load of the wireless power receiving apparatus 200-A is very large, which means that a large amount of power is required to charge the wireless power receiving apparatus 200-A. In this case, equivalent resistance of the internal battery of the wireless power receiving apparatus 200-A is very low and a large amount of current flows through the wireless power receiving apparatus 200-A during charging, thereby inducing a relatively low voltage V1.

On the other hand, the internal battery of the wireless power receiving apparatus 200-C is completely charged, that is, charging load of the wireless power receiving apparatus 200-C is small, and thus, power charging does not proceed any more. In this case, equivalent resistance of the internal battery of the wireless power receiving apparatus 200-C is very high and charging current barely flows, thereby inducing a relatively high voltage V3.

In this case, when the amount of power transmitted from the wireless power transmitting apparatus 100 is increased in order to charge the wireless power receiving apparatus 200-A, that is, to maintain a voltage induced in the wireless power receiving apparatus 200-A at a minimum charging voltage or more, an excessively high voltage may be induced in the wireless power receiving apparatus 200-C, and thus, an internal circuit of the wireless power receiving apparatus 200-C may break down.

The wireless power receiving apparatus 200 may monitor and control an amplitude of a voltage applied from the wireless power transmitting apparatus 100 such that the voltage may not exceed the allowable voltage.

Hereinafter, a wireless power transmitting apparatus and wireless power receiving apparatus included in the wireless power transmission system according to the present invention will be described in detail.

Figure 4:
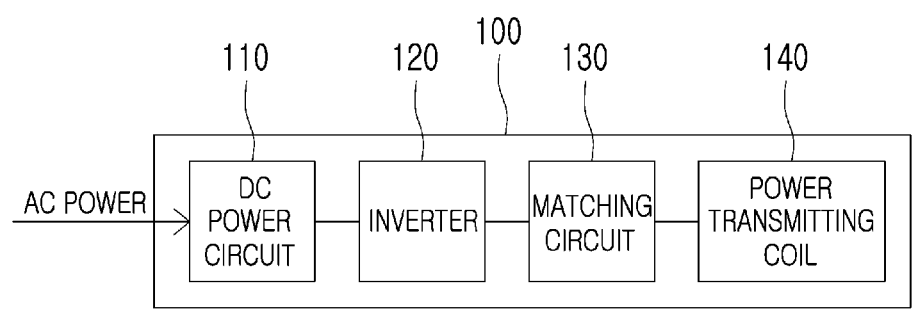
FIG. 4 is a block diagram for describing a structure of a wireless power transmitting apparatus in detail, according to an embodiment of the present invention.

FIG. 4 is a block diagram for describing a structure of the wireless power transmitting apparatus 100 in detail, according to an embodiment of the present invention.

Referring to FIG. 4, the wireless power transmitting apparatus 100 includes a DC power circuit 110, an inverter 120, a matching circuit 130, and the power transmitting coil 140.

The DC power circuit 110 receives external AC power and rectifies the external AC power into DC power. In this case, the DC power circuit 110 may be a switching mode power supply (SMPS), an adaptor, an AC-DC converter, or the like. The rectified DC power is input to the inverter 120 and is converted into an RF power signal of a desired frequency. In this regard, the frequency of the RF power signal converted via the inverter 120 may be a resonant frequency of the power transmitting coil 140. The wireless power transmitting apparatus 100 may further include a control circuit (not shown) for controlling the inverter 120 for conversion to a desired frequency and voltage. In addition, the wireless power transmitting apparatus 100 may further include a low pass filter (not shown) in order to filter a harmonic frequency or an unwanted frequency from the RF power signal output from the inverter 120.

The converted RF power signal may be applied to the power transmitting coil 140 to generate a magnetic field around the power transmitting coil 140. In this regard, a resonant frequency ($f_c$) of the RF power signal may satisfy $f_c=1/(2\pi\sqrt{LC})$, where L is inductance of the power transmitting coil 140 and C is capacitance of the matching circuit 130. The matching circuit 130 may be a series/parallel resonance circuit including one or more inductors or capacitors that are connected to each other in series or in parallel. Impedance matching may be performed on the power transmitting coil 140 by controlling inductance or capacitance.

Figure 5:
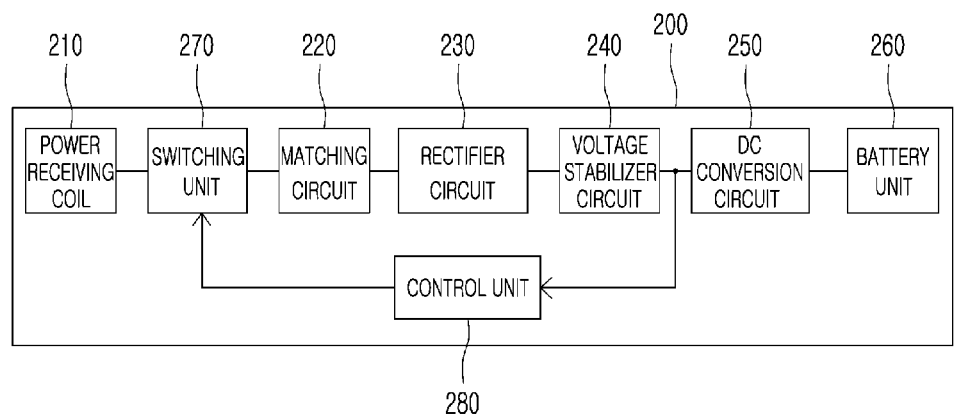
FIG. 5 is a block diagram for describing a structure of a wireless power receiving apparatus in detail, according to an embodiment of the present invention.

FIG. 5 is a block diagram for describing a structure of the wireless power receiving apparatus 200 in detail, according to an embodiment of the present invention.

Referring to FIG. 5, the wireless power receiving apparatus 200 includes the power receiving coil 210, a matching circuit 220, a rectifier circuit 230, a voltage stabilizer circuit 240, a DC converter circuit 250, a switching unit 270, and a control unit 280 and may charge a battery unit 260 with received power or may supply the received power to the load device 300 (refer to FIG. 1) outside the wireless power receiving apparatus 200.

The power receiving coil 210 is coupled to a magnetic field generated by the power transmitting coil 140 of the wireless power transmitting apparatus 100 and receives an RF power signal. The received RF power signal is passed through the matching circuit 220, is converted into DC output power by the rectifier circuit 230, and is input to the DC converter circuit 250 through the voltage stabilizer circuit 240. The DC converter circuit 250 may convert the input DC output power to a desired voltage and transmit the DC output power to the battery unit 260 or the load device 300 outside the wireless power receiving apparatus 200 such that the battery unit 260 or the load device 300 may be charged with the DC output power. In this case, the wireless power receiving apparatus 200 may include the matching circuit 220 for impedance matching between the power receiving coil 210 and the internal circuit.

The switching unit 270 allows or prevents introduction of the RF power signal to the rectifier circuit 230 between the power receiving coil 210 and the rectifier circuit 230. In this case, the switching unit 270 may be disposed between both ends of the power receiving coil 210 or the matching circuit 220 or may be disposed on a path between the power receiving coil 210 and the matching circuit 220.

The control unit 280 measures a voltage induced in the internal circuit, compares the voltage with a predetermined allowable voltage, and controls an operation of the switching unit 270.

In detail, the control unit 280 measures the voltage of DC output power stabilized through the voltage stabilizer circuit 240 and checks whether the measured voltage is within a target voltage range. When the measured voltage exceeds the target voltage range, the control unit 280 may control the switching unit 270 such that the power receiving coil 210 and the internal circuit are separated from each other, thereby reducing power received by the wireless power receiving apparatus 200.

In this case, the control unit 280 may turn the switching unit 270 on/off with a differential duty ratio that is set based on a predefined control algorithm according to a degree by which the measured voltage exceeds the target voltage range. The duty ratio is set based on Equation 1 below.

$$\text{Duty ratio} = [\text{allowable voltage} \div \text{measured voltage}] \times 100\% \quad (1)$$

For example, when a duty ratio is set to 30 based on a voltage measured when control is not performed on the switching unit 270, if the switching unit 270 is controlled, the wireless power receiving apparatus 200 may receive only 30% of the measured voltage. Likewise, when a duty ratio is set to 50, if the switching unit 270 is controlled, the wireless power receiving apparatus 200 may receive only 50% of the measured voltage.

Thus, when power load of the wireless power receiving apparatus 200 is not changed, if the measured voltage exceeds the allowable voltage by as much as 25%, an overvoltage is applied to the wireless power receiving apparatus 200 by as much as 25%. In this case, a duty ratio may be set to 80 and the switching unit 270 may be controlled so as to maintain a voltage applied to the wireless power receiving apparatus 200 within the allowable voltage. The duty ratio 80 may be obtained according to Equation below.

$$80(\text{duty ratio}) = [100(\text{allowable voltage}) \div 125(\text{measured voltage})] \times 100\%$$

That is, the control unit 280 may compare the voltage induced in the internal circuit of the wireless power receiving apparatus 200 with the allowable voltage and may control the switching unit 270 according to a duty ratio corresponding the comparison result. In this case, Equation 1 above is described under an assumption that there is no circuit loss. In reality, duty ratio control may be begun by using a value obtained from Equation 1 above as an initial value. In addition, in order to compensate for power loss due to various reasons such as circuit efficiency, the duty ratio control may be performed by a feedback control unit for adjusting a duty ratio according to the measured voltage.

Figure 6:
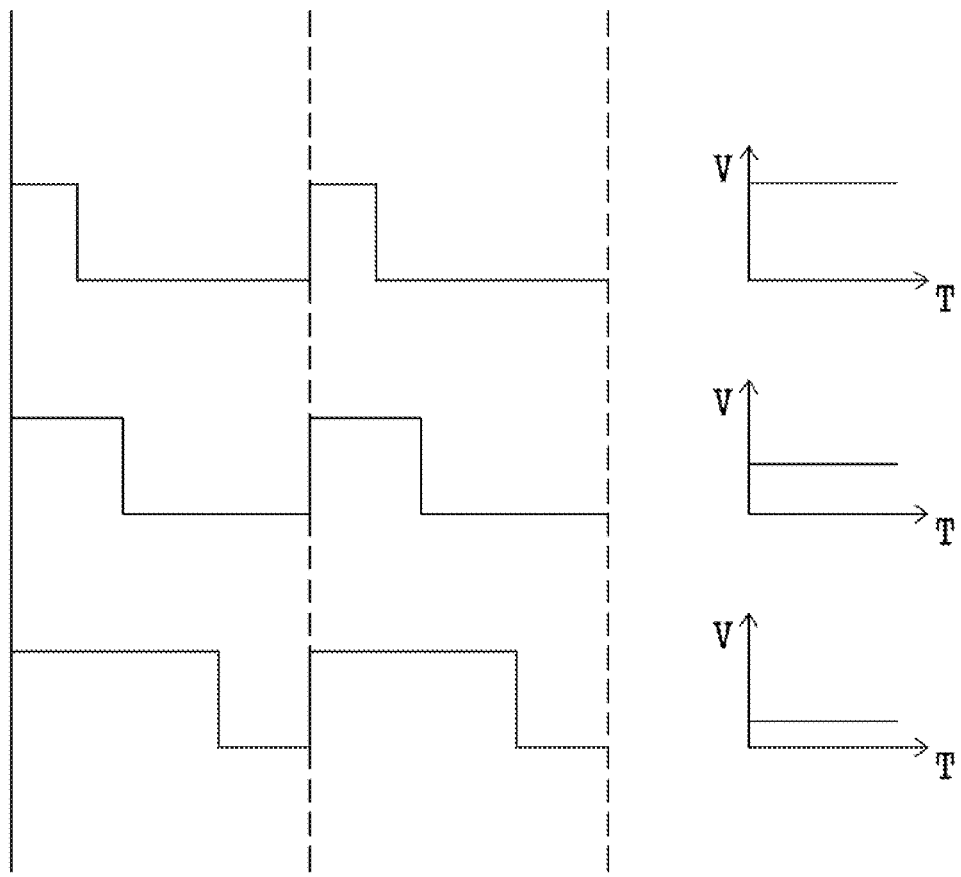
FIG. 6 is a graph showing a voltage change according to a receiving control duty ratio in a wireless power receiving apparatus, according to an embodiment of the present invention.

FIG. 6 is a graph showing a voltage applied to the internal circuit of the wireless power receiving apparatus 200 according to an on/off duty ratio of the switching unit 270. In this case, when the switching unit 270 is turned on, power is blocked. When the switching unit 270 is turned off, the wireless power receiving apparatus 200 wirelessly receives the power. Thus, as a period of time when the switching unit 270 is turned on is increased, the voltage applied to the internal circuit may be reduced. As a period of time when the switching unit 270 is turned off is increased, the voltage applied to the internal circuit may be increased. Alternatively, the block and supply of the power based on the on/off of the switching unit 270 may be performed in an opposite manner to the above-described manner. However, throughout this specification, a case in which when the switching unit 270 is turned on, the power is blocked is described. That is, as a period of time when the switching unit 270 is turned off is increased, a duty ratio is increased. When a period of time when the switching unit 270 is turned off is reduced, the duty ratio is reduced.

Through the above-described configuration, the wireless power receiving apparatus 200 according to the present invention may measure the voltage induced in the internal circuit and may automatically control the switching unit 270 according to the measurement result so as to control the voltage induced by received power within an allowable voltage range, thereby preventing the internal circuit from breaking down due to an overvoltage.

A wireless power receiving method based on the above-described configuration will now be described.

Figure 7:
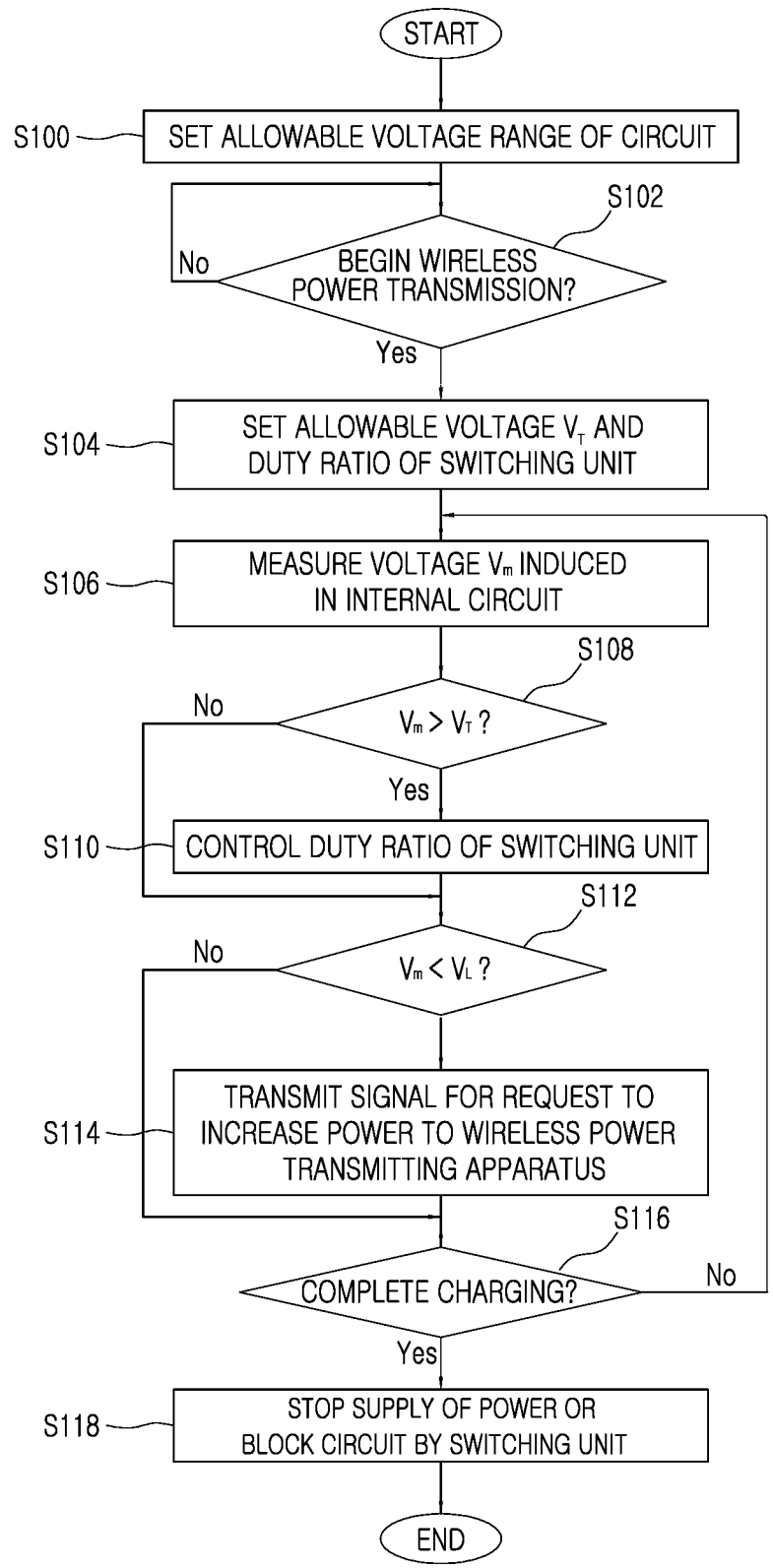
FIG. 7 is a flowchart of a wireless power receiving method via feedback control of an allowable voltage induced in an internal circuit, according to an embodiment of the present invention.

FIG. 7 is a flowchart of a wireless power receiving method according to an embodiment of the present invention.

Referring to FIG. 7, the wireless power receiving apparatus 200 predetermined an allowable voltage range of an internal circuit thereof (S100). Control input data for controlling a duty ratio corresponding to the predetermined allowable voltage range may be written in a table and stored in a storage region. In addition, an allowable voltage $V_T$ of the internal circuit and a minimum charging voltage $V_L$ required for charging may be set and stored in the table.

When the wireless power receiving apparatus 200 wirelessly receives power (S102), the wireless power receiving apparatus 200 may set the allowable voltage $V_T$ of the internal circuit and may set an initial duty ratio of the switching unit 270, based on the control input data (S104).

Then, the wireless power receiving apparatus 200 measures a voltage Vm induced in the internal circuit (S106). When the induced voltage Vm is higher than the allowable voltage $V_T$ of the internal circuit (S108), an on/off duty ratio of a switching unit is adjusted such that a circuit voltage does not exceed the allowable voltage $V_T$ by reducing power received by the wireless power receiving apparatus 200, and the switching unit is controlled (S110).

When the induced voltage Vm is lower than the minimum charging voltage $V_L$ (S112), a signal for a request to increase power is transmitted to the wireless power transmitting apparatus 100 through a communication circuit (not shown) (S114). In this case, the minimum charging voltage VL may equal the allowable voltage VT. When a voltage controlled by the switching unit 270 is higher than the minimum charging voltage VL, a sufficient amplitude of a voltage required for the charging is applied to the DC converter circuit 250, and thus, the charging proceeds again.

Then, when the charging is completed (S116), the wireless power receiving apparatus 200 may control the switching unit 270 or may ask the wireless power transmitting apparatus 100 to stop the supply of power in communication with the wireless power transmitting apparatus 100 (S118).

Through the above-described configuration, the present invention may protect an internal circuit such that a wireless power receiving apparatus may monitor a voltage induced in an internal circuit thereof and may prevent introduction of overpower to the internal circuit whereby the internal circuit may break down.

In addition, the wireless power receiving apparatus may control the voltage induced in the internal circuit within an appropriate operating voltage range and may control a charge speed.

As is apparent from the above description, the present invention provides a wireless power receiving apparatus that may monitor a voltage induced in an internal circuit thereof and may prevent introduction of overpower to the internal circuit whereby the internal circuit may break down, thereby protecting the internal circuit.

In addition, the present invention provides a wireless power receiving apparatus that may control the voltage induced in the internal circuit thereof within an appropriate operating voltage range and may control a charge speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless power receiving apparatus comprising:
   a power receiving coil for receiving a power signal wirelessly transmitted;
   a rectifier circuit for rectifying the wirelessly received power signal into direct current (DC) output power;
   a switching unit for controlling input of the power signal to the rectifier circuit at an rear end of the power receiving coil; and
   a control unit for measuring a voltage of the DC output power rectified by the rectifier, comparing the voltage with a predetermined allowable voltage, and controlling an operation of the switching unit,
   wherein the control unit lowers a voltage of the power signal being input into the rectifier by controlling a duty ratio about periods of time that the switching unit is turned on and off, when the measured voltage of the DC output power exceeds the allowable voltage.

2. The wireless power receiving apparatus according to claim 1, wherein the switching unit is disposed between both ends of the power receiving coil or a matching circuit or is disposed on a path between the power receiving coil and the rectifier circuit.

3. The wireless power receiving apparatus according to claim 1, wherein the control unit selects a duty ratio set for each respective voltage level in a circuit operating voltage table, based on the measured voltage, and controls the switching unit with the duty ratio.

4. The wireless power receiving apparatus according to claim 1, wherein the switching unit controls supply of the DC output power to a battery between the rectifier circuit and the battery.

5. The wireless power receiving apparatus according to claim 1, wherein the power receiving coil and a power transmitting coil of a wireless power transmitting apparatus are magnetically coupled to each other to transmit the power signal using a magnetic induction method or a magnetic resonance method.

6. The wireless power receiving apparatus according to claim 1, further comprising a matching circuit disposed between the power receiving coil and the rectifier circuit and comprising at least one of a serial resonance circuit and a parallel resonance circuit.

7. A wireless power transmission system comprising:
   a wireless power transmitting apparatus for transmitting a power signal to a power transmitting coil to generate a magnetic field around the power transmitting coil; and
   one or more wireless power receiving apparatuses coupled to the magnetic field, for wirelessly receiving the power signal,
   wherein the wireless power receiving apparatuses measure a change in a voltage of the power signal and control received power, based on the measurement result,
   wherein each of the wireless power receiving apparatuses comprises:
   a power receiving coil magnetically coupled to the power transmitting coil, for receiving the power signal;
   a rectifier circuit for rectifying the wirelessly received power signal into direct current (DC) output power;
   a switching unit for controlling input of the power signal to the rectifier circuit at a rear end of the power receiving coil or on a path between the power receiving coil and the rectifier circuit; and
   a control unit for measuring a voltage of the DC output power rectified by the rectifier, comparing the voltage with a predetermined allowable voltage, and controlling an operation of the switching unit,
   wherein the control unit lowers a voltage of the power signal being input into the rectifier by controlling a duty ratio about periods of time that the switching unit is turned on and off, when the measured voltage of the DC output power exceeds the allowable voltage.

8. The wireless power transmission system according to claim 7, wherein the control unit selects a duty ratio set for each respective voltage level in a circuit operating voltage table, based on the measured voltage, and controls the switching unit with the duty ratio.

9. The wireless power transmission system according to claim 7, wherein the power receiving coil and the power transmitting coil are magnetically coupled to each other to transmit the power signal using a magnetic induction method or a magnetic resonance method.

10. The wireless power transmission system according to claim 7, wherein the each of the wireless power receiving apparatuses further comprises a matching circuit disposed between the power receiving coil and the rectifier circuit and comprising at least one of a serial resonance circuit and a parallel resonance circuit.

11. A wireless power receiving method of a wireless power receiving apparatus, the method comprising:

receiving a power signal wirelessly via magnetic resonance coupling at a power receiving circuit;

connecting the power receiving coil and an internal circuit to each other through a switching unit;

measuring a voltage induced in the internal circuit by the wirelessly received power signal; and controlling the switching unit so as to maintain the measured voltage within an operating voltage range of the internal circuit, wherein the method further comprises predetermining at least one of the operating voltage range of the internal circuit and a maximum allowable voltage, prior to the receiving the power signal, wherein the controlling the switching unit comprises controlling the operation of the switching unit with a predetermined duty ratio to reduce the voltage induced in the internal circuit by the wirelessly received power signal, when the measured voltage is equal to or greater than the maximum allowable voltage.

12. The method of claim 11, wherein the controlling the switching unit comprises selecting a duty ratio set for each respective level in a circuit operating voltage table based on the measured voltage, and controlling the operation of the switching unit with the duty ratio.

\* \* \* \* \*